US012671998B2

(12) United States Patent
Alayasra et al.

(10) Patent No.: US 12,671,998 B2
(45) Date of Patent: Jun. 30, 2026

(54) LOCATION-BASED SECURE COMMUNICATION METHOD BASED ON IRS

(71) Applicant: ISTANBUL MEDIPOL UNIVERSITESI, Istanbul (TR)

(72) Inventors: Musab Mahmoud Abd Alkareem Alayasra, Istanbul (TR); Hüseyin Arslan, Istanbul (TR)

( * ) Notice: Subject to any disclaimer, the term of this patent is extended or adjusted under 35 U.S.C. 154(b) by 48 days.

(21) Appl. No.: 18/718,734

(22) PCT Filed: Dec. 8, 2022

(86) PCT No.: PCT/TR2022/051451
§ 371 (c)(1),
(2) Date: Jun. 11, 2024

(87) PCT Pub. No.: WO2023/113738
PCT Pub. Date: Jun. 22, 2023

(65) Prior Publication Data
US 2025/0048110 A1 Feb. 6, 2025

(30) Foreign Application Priority Data
Dec. 15, 2021 (TR) ................................ 2021/019978

(51) Int. Cl.
*H04W 12/63* (2021.01)
*H04B 7/04* (2017.01)
*H04W 12/037* (2021.01)

(52) U.S. Cl.
CPC ......... *H04W 12/63* (2021.01); *H04W 12/037* (2021.01)

(58) Field of Classification Search
CPC .. H04W 12/63; H04W 12/037; H04B 7/0617; H04B 7/04013
See application file for complete search history.

(56) References Cited

U.S. PATENT DOCUMENTS

| | | | | |
|---|---|---|---|---|
| 12,136,823 B2 * | 11/2024 | Park | ........................ | H02J 50/40 |
| 2021/0288698 A1 * | 9/2021 | Chen | .................... | H04B 7/0617 |
| 2023/0239723 A1 * | 7/2023 | Gurelli | .................... | H04L 45/24 |
| | | | | 370/329 |

FOREIGN PATENT DOCUMENTS

| | | |
|---|---|---|
| CN | 112422162 A | 2/2021 |
| CN | 112986903 A | 6/2021 |
| WO | 2021221603 A1 | 11/2021 |

OTHER PUBLICATIONS

International Search Report for corresponding PCT/TR2022/051451, dated Apr. 7, 2023.
Written Opinion of the International Searching Authority for corresponding PCT/TR2022/051451, dated Apr. 7, 2023.

* cited by examiner

*Primary Examiner* — Pramila Parthasarathy
(74) *Attorney, Agent, or Firm* — Egbert, McDaniel & Swartz, PLLC

(57) ABSTRACT

Disclosed is a method for a location-based secure communication based on IRS. The controlled multipath components of the reflected signal are exploited by IRS, and secure communication is enabled through shuffling the phases of those components so they add constructively only at the intended receiver.

1 Claim, 2 Drawing Sheets

LOCATION-BASED SECURE COMMUNICATION METHOD BASED ON IRS

TECHNICAL FIELD

The present invention relates to a new method for a location-based secure communication based on intelligent reflecting surface (IRS). In the method of invention by exploiting the controlled multipath components of the reflected signal by IRS, secure communication is enabled through shuffling the phases of those components so they add constructively only at the intended receiver.

PRIOR ART

Secure communication is a major problem in wireless communication, and there are different approaches in which this problem is addressed. One of them is called Directional Modulation. In such approaches, beamforming is employed to disturb the signal in all directions except at the intended receiver side. This scheme provides a good security performance, however, it requires a direct link between the transmitter and receiver, as it is the only link in which the signal can be fully controlled. The main drawback for directional modulation is the need for a line-of-sight (LOS) link; in the case of non-LoS communication, it is not possible to have complete, real-time control over the propagated signal over a given path. To solve this problem, IRS is proposed to enable directional modulation using its quasi-LOS link.

Directional modulation is one of the robust solutions for physical layer security. It is based on changing the beam shape in real-time so that the received signal at a given direction gives the desired constellation point but in other directions, it is messed so the eavesdropper will not be able to detect the data signal. However, it has the main drawback which is the requirement of having a LoS link with the receiver. And another problem is that this link will not be secure. This problem is addressed in the literature by exploiting the multipath components reflected by the objects in the environment or by deploying multiple base stations to serve the same user. The objects in the environment are not reliable and they are not guaranteed to always give enough degree of freedom in the design. Also, allocating multiple base stations to serve the same user induces high implementation costs.

The methods proposed in the prior art are disadvantageous in the sense that (i) they require to have an LoS link, (ii) the LoS link is unsecure, (iii) to overcome the unsecure LoS link complex solutions deploying multiple base stations are required and (iv) the transmitter must have multiple antenna elements to be able to implement these methods.

AIM OF THE INVENTION

The method of the invention aims to employ IRS as a controlled scattering cluster to provide location-based secure communication by encoding the reflected multipath components

BRIEF DESCRIPTION OF THE INVENTION

The invention relates to a method for a location-based secure communication based on IRS characterized in that said method comprises the steps of;

Setting tier-1 beamforming to focus the reflected signal toward the receiver,

Setting tier-2 beamforming to change in real-time

Wherein the phases of the reflected multipath components should be selected so that the resolved multipath component at the receiver side, which is a linear combination of the physical components corresponding to the segments, has strength above a given accepted power threshold and its phase add to a given fixed value Directional modulation is a robust scheme for physical layer security; however, it requires an LoS link between transmitter and receiver, and it does not work for single-element transmitters.

The method of the invention eliminates these issues by enabling a quasi-LoS between transmitter and receiver with full control over its signal. Also, it replaces beamforming at the transmitter by beamforming at IRS in the channel.

The invention also solves the problem of the insecure LoS link by manipulating the channel before and after IRS as a controlled scattering cluster.

Also, the method of the invention uses IRS as an enabler for a controlled link that replaces LoS link with even more design flexibility.

All in all, the advantages provided by the method of the invention can be listed as below.

1. The method of invention provides a reliable, stable, and secure multipath component (combination of physical components) to the receiver, regardless of the channel condition.
2. Directional modulation requires multiple elements at the transmitter for beamforming, but the method of invention has no such requirement as there is a degree of control over the channel by IRS.
3. It provides secure communication with no additional complexity in design.
4. With the large enough size of IRS, the method of invention provides secure communication at the sub-wavelength coherence distance. For example, at mmWave, the vulnerability region around the user would have dimensions in sub-mmeters.
5. The method of the invention solves the problem of the insecure LoS link by using either large IRS or two separate IRSs.
6. The method of the invention does not require an LoS link.
7. The method of the invention has no requirement for the system units. It can work robustly for single-element antennas at transmitter and receiver while the eavesdropper can have any number of elements. Also, the system works even if the eavesdropper knows the channel between transmitter and receiver as long as IRS is large enough to have a sufficient number of multipath components for encoding.
8. The method of the invention has no limitations on the field of operation for IRS

B: Symbol duration

C: Time

D: IRS Phase duration

201: Case 1

Figure 1:
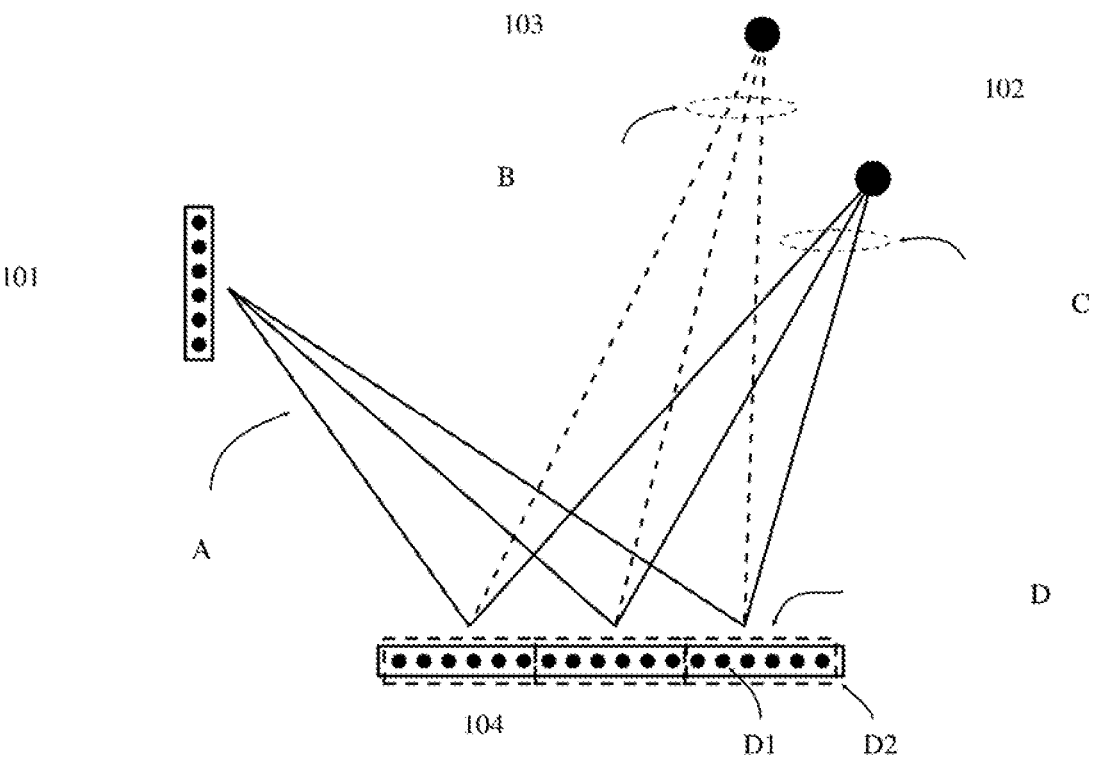
FIG. 1: The scenario considered by the inventors
101: Transmitter
102: Receiver
103: Eavesdropper
104: IRS
A: One multipath component
B: Multipath components adding destructively
C: Multipath components adding constructively
D: Segmentation based on the distance with receiver
D1: Element
D2: Segment
Figure 2:
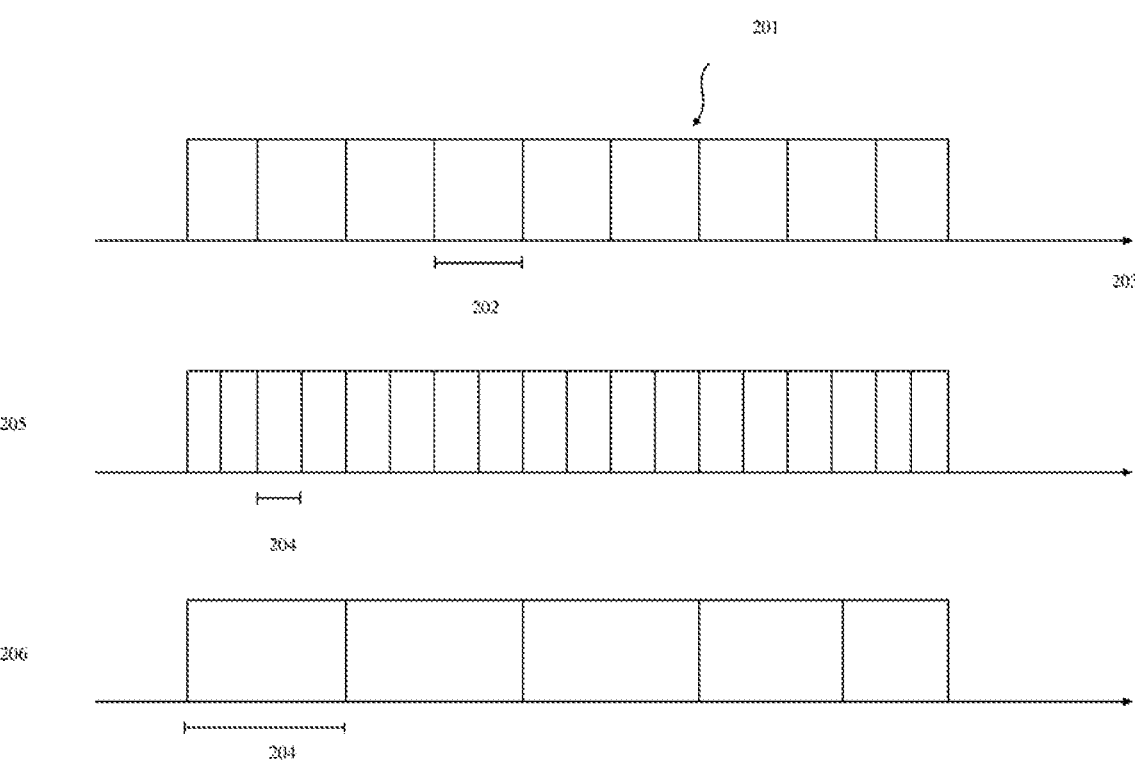
FIG. 2: Scheme depicting that there can be different phase change rates at the IRS A: Channel coherence time (one frame duration)

Here in case 1, it is shown that IRS can change its phases at higher rate compared to the symbol rate. In this case IRS is more active and consumes more power and eventually, it will give more secure transmission.

202: Case 2

In case 2, it is shown that IRS can change its phases at a slower rate compared to the symbol rate.

DETAILED DESCRIPTION OF THE INVENTION

The invention relates to a method for a location-based secure communication based on IRS characterized in that said method comprises the steps of;

Setting tier-1 beamforming to focus the reflected signal toward the receiver,

Setting tier-2 beamforming to change in real-time

Wherein the phases of the reflected multipath components should be selected so that the resolved multipath component at the receiver side, which is a linear combination of the physical components corresponding to the segments, has strength above a given accepted power threshold and its phase add to a given fixed value Herein the inventors would like to describe "the selection of the multipath components" wherein one set of segments change their phases randomly, while another set adjust accordingly so that the components at the receiver side add as desired. It should also be mentioned that the sets of those changing their phases randomly and those adjusting theirs accordingly are changed randomly as well from one "IRS phase duration" to another.

In the method of the invention tier-1 is set to get focused beams toward the user during the whole frame transmission, but tier-2 beamforming is adjusted from one "IRS phase duration" to another, so that the phases change randomly at all locations except the user location.

In the method of the invention the "accepted power threshold" depends on the system requirements. For some systems it might be required to have signal-to-noise ration (SNR) to be above some given threshold so the power threshold here is adjusted accordingly.

In the method of the invention addition of phase to a given fixed value refers to the case where, the adjusted phase should be known to transmitter or receiver so that they remove its effect and get the write constellation diagram (in other words, avoiding phase ambiguity). One other option is that IRS itself removes this phase and force it to 0 or any multiple of 2pi, which is equivalent to 0.

Setting tier-1 beamforming to focus the reflected signal toward the receiver has the technical benefit of maximizing its signal-to-noise ratio, regardless of the signal condition at the eavesdropper.

The phase applied by tier-2 beamforming to a given segment is common to all its elements, and its goal is to adjust the phases of reflected multi-party communications (MPC) so that they add constructively at a given location. Setting tier-2 beamforming to change in real-time has the technical effect of changing the phases of all segments pseudo-randomly and thus the multipath components add constructively and build the right constellation at the receiver side, but mess that at the eavesdropper side and degrade its received signal strength.

Herein, tier-2 beamforming for multipath component shuffling, which can also be described as shuffling in real-time at different speeds, as disclosed in the method of the invention can be done in different ways. In a preferred embodiment of the invention tier-2 beamforming for multipath component shuffling is achieved by grouping segments in pairs such that in a given pair for one phase duration, one segment selects a random phase and the other selects one to remove its effect at the user location. In the next phase duration another pair is selected randomly and the same procedure applies. In this way, the eavesdropper will not be able to recognize the phase changes over different durations.

The main idea behind the method of the invention is to keep the channel coherence time the same for the receiver, but make the channel fast fading for eavesdroppers by randomly changing the phases.

In the method of the invention, depending on the rate of the phase change at the IRS security of the system may change. While systems with fast changes are more secure, for systems with slow phase change can become more secure with the help of using a proper code for the frame.

In a preferred embodiment of the invention the scenario considered can be defined as comprising four system units; transmitter, receiver, eavesdropper, and IRS. All units are assumed to be uniform linear arrays (the extension to uniform planer array is straightforward), except for the receiver.

In order to make the scenario worse in terms of security, the receiver is assumed to have single element antennas with no beamforming while the eavesdropper is more sophisticated with multiple elements. Also, the eavesdropper is assumed to know perfectly the locations of the transmitter, receiver and IRS.

By design, the location of IRS relative to the transmitter is known. For instance, the transmitter can be an access point deployed along with the IRS in the environment.

Also, the location of the receiver relative to IRS is assumed to be known after a training session along with channel estimation.

The channel between transmitter and receiver is assumed to be sparse and represented by a countable number of scatterers in the environment:

$$h = h^L + h^S = \sum_{i=1}^{N_{LS}} \beta_i a_T^T(\theta_{TLi}) + \sum_{i=1}^{N_S} \alpha_i a_T^T(\theta_i)$$

The channel is split into two subchannels: type-L channel and type-S channel. The former represents the controlled scatterers, which are $N_{LS}$ groups of IRS elements called segments as discussed later. The latter represent ordinary scatterers in the environment, which are out of control and their number is $N_S$. The gains $\alpha_i$'s and angles $\theta_i$'s corresponding to the ordinary scatterers are random and need to be estimated for each coherence transmission. On the other hand, the gains $\beta_i$'s and angles $\theta_{TLi}$'S correspond to the controlled scatterers which are known and controlled for known receiver location. The vector $a_T(\theta)$ represents the response vector of the transmitter at a given angle. The controlled gains depend on the beamforming design at the IRS side; for more detail, please refer to M. Alayasra and H. Arslan, "IRS-Enabled Beam-Space Channel," in IEEE Transactions on Wireless Communications, doi: 10.1109/TWC.2021.3124288, herein this document is incorporated by reference.

IRS is large in size with many reflecting elements. In practical implementations, especially, for indoor environments, other system units will operate in the near field of IRS in most cases. Therefore, instead of dealing with IRS directly in the system model, it is divided into segments of elements of smaller size that guarantee far-field operation. Those segments are the controlled scatterers in the channel model presented above. As an example of segmentation, assume that the transmitter and receiver are located at distances d1 and d2 far from IRS center, but d1<d2. Then, based on d1, the segments of IRS are chosen to have sizes with far-field boundaries not exceeding d1.

The reflected signal by IRS is a cluster of rays or multipath components that are controlled by IRS. Each segment has two tiers of beamforming; one at the element level and another at the segment level. The phase profile of the segment is first designed to steer the received signal in a given direction. The segment can be viewed to have two beams; one is incident and the other is reflected. The angle between these two beams is adjusted by setting the phases of the segments elements properly based on this angle. Based on the known locations of both transmitter and receiver, the incident beam is the one coming from the transmitter and the reflected beams are adjusted so that the reflected signal is focused toward the receiver. The second tier of beamforming treats each segment of IRS as a virtual element of the IRS as an antenna.

INDUSTRIAL APPLICABILITY OF THE INVENTION

The method of the invention is mainly applicable to wireless applications.

Security is an essential component in any wireless communication system, like WiFi for example. One way to secure the communication is by applying cryptography at the application layer of the network. However, down at the physical layer level, we can exploit the channel to provide secure communication. There are different solutions at the physical layer like artificial noise and beamforming; everyone has advantages and disadvantages and working scenarios. Here we are proposing a robust and simple way using IRS. So the invention fits to all communication systems that requires secure communication, personal, industrial, etc.

Specifically, secure communication is critical for many wireless applications. More specifically, the method of the invention applies to mmWave communication with sparse channels.

One example for the industrial applicability of the method of invention can be vehicle to vehicle communication, this communication has to be very secure otherwise, malicious attacks would cause serious accidents.

Around these basic concepts, it is possible to develop several embodiments regarding the subject matter of the invention; therefore the invention cannot be limited to the examples disclosed herein, and the invention is essentially as defined in the claims. Separate embodiments of the invention can be combined where appropriate.

It is obvious that a person skilled in the art can convey the novelty of the invention using similar embodiments and/or that such embodiments can be applied to other fields similar to those used in the related art. Therefore it is also obvious that these kinds of embodiments are void of the novelty criteria and the criteria of exceeding the known state of the art.

The invention claimed is:

1. A method for location-based secure communication based on intelligent reflecting surface (IRS) by encoding reflected multipath components, the method comprising:
   setting a tier-1 beamforming to focus a reflected signal toward a receiver;
   setting a tier-2 beamforming to change during transmission; and
   selecting phase of the reflected multipath components SO that a resolved multipath component at the receiver has a strength above a given accepted power threshold, the resolved multipath component being a linear combination of physical components corresponding to segments thereof, wherein the step of setting the tier-2 beamforming is achieved by grouping the segments in pairs such that one segment of the segment of pairs selects a random phase and another segment of the segments in pair selects one to remove an effect thereof and a user location for a given pair for one phase duration, wherein another pair is selected randomly in a following phase duration.

\* \* \* \* \*